United States Patent [19]

Quinquis et al.

[11] Patent Number: 4,993,024
[45] Date of Patent: Feb. 12, 1991

[54] SYSTEM AND PROCESS FOR CONTROLLING THE FLOW OF EITHER DATA PACKETS OR CHANNEL SIGNALS IN AN ASYNCHRONOUS TIME MULTIPLEXER

[75] Inventors: Jean-Paul Quinquis, Perros Guirec; Michel Servel, Lannion; Joël Francois, Perros-Guirec, all of France

[73] Assignee: L'Etat Francais represente par le Ministre des PTT Centre National d'Etudes des Telecommunications 5CNet, France

[21] Appl. No.: 182,912

[22] Filed: Apr. 18, 1988

[30] Foreign Application Priority Data

May 26, 1987 [FR] France ............................ 87 07555

[51] Int. Cl.⁵ ............................................ H04J 3/26
[52] U.S. Cl. ................................. 370/94.1; 370/84
[58] Field of Search ............... 370/94, 60, 84, 13, 370/108; 375/109, 118

[56] References Cited

U.S. PATENT DOCUMENTS

| 4,031,317 | 6/1977 | McClain et al. | 375/109 |
| 4,110,558 | 8/1978 | Kageyama et al. | 375/109 |
| 4,475,192 | 10/1984 | Fernow et al. | 370/94 |
| 4,611,322 | 9/1986 | Larson et al. | 370/60 |
| 4,807,259 | 2/1989 | Yamanaka et al. | 375/109 |

Primary Examiner—Benedict V. Safourek
Assistant Examiner—Min Jung
Attorney, Agent, or Firm—Laff, Whitesel, Conte & Saret

[57] ABSTRACT

A system and process for controlling the flow of packets carried by asynchronous time multiplex (EPACi) channels. The packets from one communication link are identified by their label and the identity of the multiplex channels which carries them. The process is comprised of allocating for each communication a predetermined clock rate and a predetermined threshold value, measuring the difference between the number of packets entering belonging to the communication and the number of pulses generated by the clock, lower bounding this difference, and, if the difference reaches a predetermined threshold, triggering a signal (DEP) which causes the detection of packets belonging to the communication in question as long as the difference is not less than the predetermined threshold. The signal (DEP) is used by the control means of a switch (XPAC) which transmits to the source of the communication in question a message requesting it to reduce its rate, when this is possible, and, in any event, a message warning it of a loss of packets.

5 Claims, 9 Drawing Sheets

SYSTEM AND PROCESS FOR CONTROLLING THE FLOW OF EITHER DATA PACKETS OR CHANNEL SIGNALS IN AN ASYNCHRONOUS TIME MULTIPLEXER

The present invention concerns a packet flow control system for packets carried by asynchronous time multiplex channels.

The routing of whatever flows on, and the sharing of the same transmission resources constitutes the principal concern of asynchronous time techniques. In fact, asynchronous time multiplexing allows the transmission on the same support, that is, asynchronous time multiplexing of packets belonging to different virtual circuits. Each packet is made up of a label identifying the virtual circuit to which it belongs and an information block. The maximum number of virtual circuits on a multiplex channel is determined by the length in bits of the label.

However, the allocation of these resources usually relies on the activity statistics of the different transmitting sources and as such there is a non-negligible risk of loss of information if the queueing files overflow due to instantaneous overloads. We must obviously minimize these losses, but the solution is not easy since the flow generated by the different sources is of a discontinuous character and is sporadic.

One purpose of the present invention is to provide a method allowing the improvement, in real time, of the management of flow. In accordance with this method, we observe the flow of one, a number or all the virtual circuits established on one or the set of input time multiplex channels to a switch in order to prevent bottlenecking and resulting saturation of network resources to consecutive overloads due to abnormal operation, or not respecting the flow threshold level to which each communication was established.

In accordance with the invention, the process is comprised of measuring the flow of packets of each communication and, when it is found to be greater than a maximum flow threshold, called peak flow, triggering a signal which causes the elimination of packets above the peak flow for the communication concerned before they get processed by the switching machine.

The value of the peak flow is singular to each communication and is set during the setting up of the link, in concurrence with its control mechanism, that is the network control unit:
 by the user, in the case where the source he inserts into the network has a variable flow and when he knows the peak flow of this source, or
 by the network control unit, in the case of constant flow sources, or variable flow sources where the control unit can determine the average and maximum flows.

In accordance with the invention, the signalling mentioned above can be used by the control mechanisms of the switch which transmits to the source of the communication concerned a message requesting it to reduce its flow, when this is possible, and, in any case, a message warning it of the loss of packets.

In accordance with another characteristic of the invention, an up-down counter is provided whose down counting input receives pulses at the rate of the peak flow allocated to the communication concerned and whose up counter input receives a pulse upon the transmission of each packet belonging to the communication concerned, the maximum counting output of the up-down counter generating, when it is enabled, the said signalling.

In accordance with another characteristic, the said up-down counter can be formed of a first storage register, a second storage register, an incrementing adder, a counter, a first subtractor, a second subtractor, and a peak value detection circuit, the input of the counter receiving pulses at the rate of the peak flow allocated to the communication concerned and the output of the counter being connected, on one hand, to the loading input of the first counting register and to the first operand input of the first subtractor whose other operand input is connected to the output of the first counting register, the input of the adder being connected to the output of the second storage register, the outputs of the adder and of the first subtractor being connected to the operand inputs of the second subtractor whose output is connected to the loading input of the second storage register and to the input of the peak value detection circuit whose output generates the said signalling, each transmission of a packet belonging to the said concerning communication triggering the transfer of the contents of the counter and of the first storage register to the operand inputs of the first subtractor, the transfer of the contents of the second storage register into the adder, then the transfer of the contents of the adder and of the first subtractor to the operand inputs of the second subtractor, and, finally, the loading of the first and second storage registers, once the second subtraction has been done.

In accordance with another characteristic, the said up-down counter is associated with a packet identification receiver circuit for the packets carried by asynchronous time multiplex channels entering a switch, to a memory containing as many messages as identifications of links established through the switch, the said identifications constituting the addresses of the said memory, each message being made up of a number of words, two of which are used as the first and second storage registers of the said up-down counter, a time base containing a number of counters, a selector to selectively switch one output of the said counters to the first operand input of the first subtractor, each message containing a third word being used to carry out the said selection.

In accordance with another characteristic, the up-down counter comprises also a selectable ratio divider between the output of the first subtractor and the corresponding operand input of the second subtractor, each message of the said memory containing a fourth word defining the ratio of the divider.

The characteristics of the above-mentioned invention, as well as others, will appear clearer upon reading the description of a realization example of the invention, the said description being carried out in relation to the attached drawings, among which.

Figure 1:
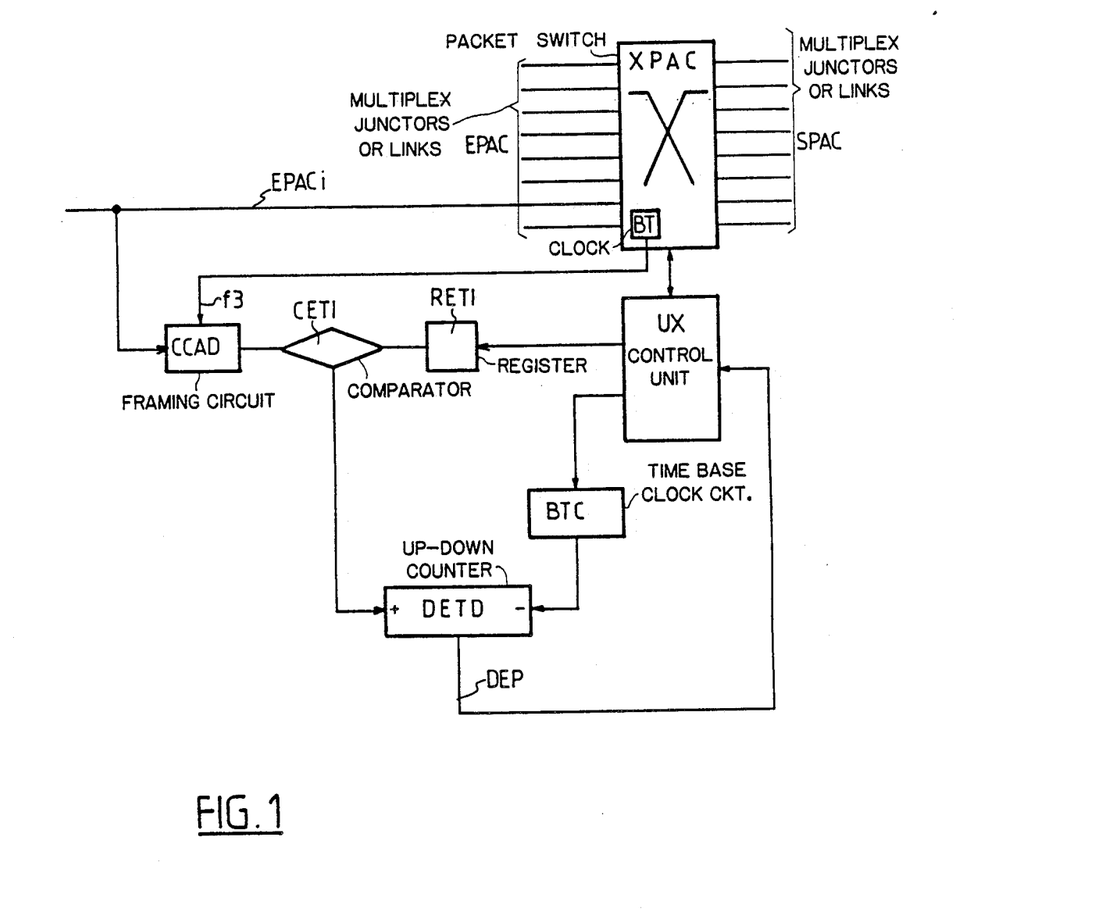
FIG. 1 is a block diagram illustrating a first embodiment of a flow control circuit associated with a packet switch.

In FIG. 1, we have shown a packet switch XPAC with it input junctions EPAC, its output junctions SPAC and its time base BT. The switch XPAC is controlled and ordered by a control unit UX which establishes the virtual circuits between the input junctions and the output junctions. For the sake of an example, the junctions EPAC and SPAC can transmit time multiplex signals such as those which are described in the document EP-A-0 108 028 (U.S. Pat. No. 4,603,416) and the switch XPAC can be of the type described in the document EP-A-0 113 639, (U.S. Pat. No. 4,594,708) the control unit UX thus including the control unit UCC which is part of this autoswitch.

As a shunt on one of the input junctions EPAC, namely EPACi, is connected a framing circuit CCAD which can frame the packets carried by the junction EPACi and remove their labels. The output of circuit CCAD is connected to the first input of a comparator CETI whose second input is connected to the output of a register RETI in which is stored the label corresponding to a virtual circuit to be monitored. The circuit CCAD is, for example, the circuit described in the document EP-A-0 113 307 and it has a clocking input f3 connected to a corresponding output of the time base BT of the switch XPAC. We recall that the signal f3 triggers the exiting, out of circuit CCAD, of the first byte of a packet, that is the label.

The output of comparator CETI is connected to the + counting input of an up-down counter DETD of capacitor N whose - down counting input is connected to the output of a time base BTC. In practice, the capacity N is selected less than the storing capacity of the switch XPAC queueing files. In practice, the storing capacity of the queueing files gives the switch some flexibility which allows it small instantaneous traffic overloads. We thus understand that it suffices that N be less than this capacity. On the other hand, N should not be selected too small, because the system would not even allow the flow of small traffic overloads.

The overflow output DEP of up-down counter DETD is connected to a corresponding input of the control unit UX, which also has an output connected to the write input of register RETI and one output connected to the frequency control input of the time base BTC. In the remainder of the description, we will indicate that the control unit UX can modify the value of the label contained in the register RETI and that the time base BTC generates at the - input of up-down counter DETD periodic pulses IC whose frequency is controlled by the control unit UX.

The circuit shown in FIG. 1 operates as follows. The control unit UX has established a virtual connection between the junction EPACi and one of the output junctions SPAC for a link of which all the packets have the label Z. Afterwards, for example, from an exchange of signalling with the source of the communication, it has established a peak flow for the link. The control unit UX thus writes into register RETI the word Z and controls, in relation to this peak flow, the frequency of the time base BTC. Each time that the comparator CETI detects a coincidence of words at its two inputs, it applies a pulse IP to the + input of up-down counter DETD.

Figure 2A:
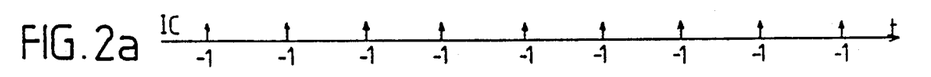
FIGS. 2a to 2c are timing diagrams illustrating the operation of the circuit of FIG. 1, FIGS. 3a to 3b are curves illustrating in a different way the operation of the circuit of FIG. 1.
Figure 2B:
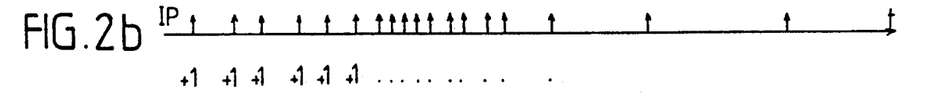
Figure 2C:
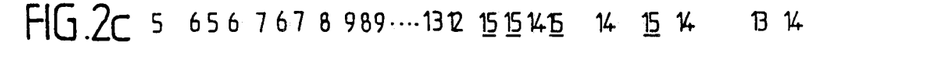

The timing diagram of FIG. 2 illustrates the pulses IC, the diagram of FIG. 2b illustrates the pulses IP and FIG. 2c indicates the successive values of the contents of up-down counter DETD. In FIG. 2c, we have assumed that the initial value of the contents was 5 and that the capacity N of the up-down counter DETED was equal to $(2^4 - 1)$. Each time that the overflow value 15 is reached, the up-down counter DETD transmits a signal DEP to the control unit UX. In accordance with the invention, the control unit UX thus orders the switch XPAC to delete the packets having the label Z and coming from the junction EPACi. Eventually, the control unit UX enters into communication with the source concerned to advise it that some packets have been deleted and that it should reduce its rate for the link in question.

Figure 3A:
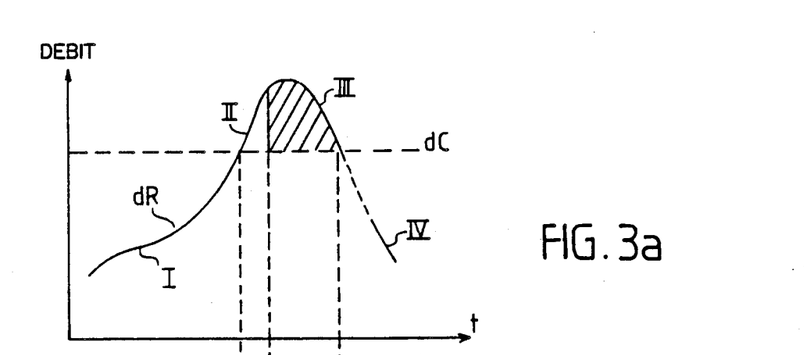
Figure 3B:
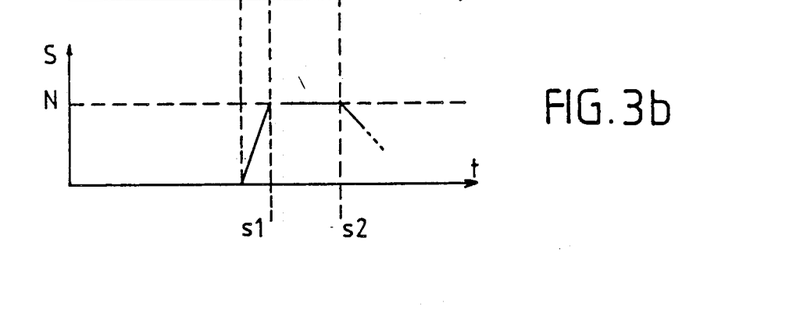

The diagram of FIG. 3a illustrates, in an analog manner, how the flow of the source in question evolves over a period of time, while the diagram of FIG. 3b shows how the contents of up-down counter DETD varies with time. It appears that as long as the flow from the source dR is less than the peak flow dC, as shown in part I of the curves of FIG. 3a, the contents of DEDT is zero. During part II of the curve, after crossing the ordinate dC, the contents of up-down counter DETED goes from 0 to N, that is from 0 to 15, in relation with the diagrams of FIGS. 2a to 2c. During part III of the curve, the up-down counter DETD is held at N=15, which brings about the deletion of packets. Finally, during part IV of the curve, the flow dR returns to a value less than dC and the contents of the up-down counter decreases to zero. The diagram of FIG. 3b thus illustrates that for a given period of time, between the points S1 and S2 all the packets arriving from the source in question are deleted. We observe that the diagrams of FIGS. 2a to 2c correspond to parts II, III and IV of the curve of FIG. 3a.

The circuit of FIG. 1 has allowed us to describe the basic operation of the packet flow control system in accordance with the invention, but it does not apply to a single link. In practice, a really efficient control system must allow control of the flow of a set of input multiplex channel EPAC from a packet switch and, in each multiplex channel EPACi, all the virtual circuits established. For the sake of an embodiment of the invention, a basic module capable of monitoring 16 entering multiplex channels from a switching matrix such as that shown in FIG. 8 of document EP-A-0 113 639 is provided. Thus, there will be as many basic modules as there are switch matrices in the first stage of a packet switch.

Figure 4:
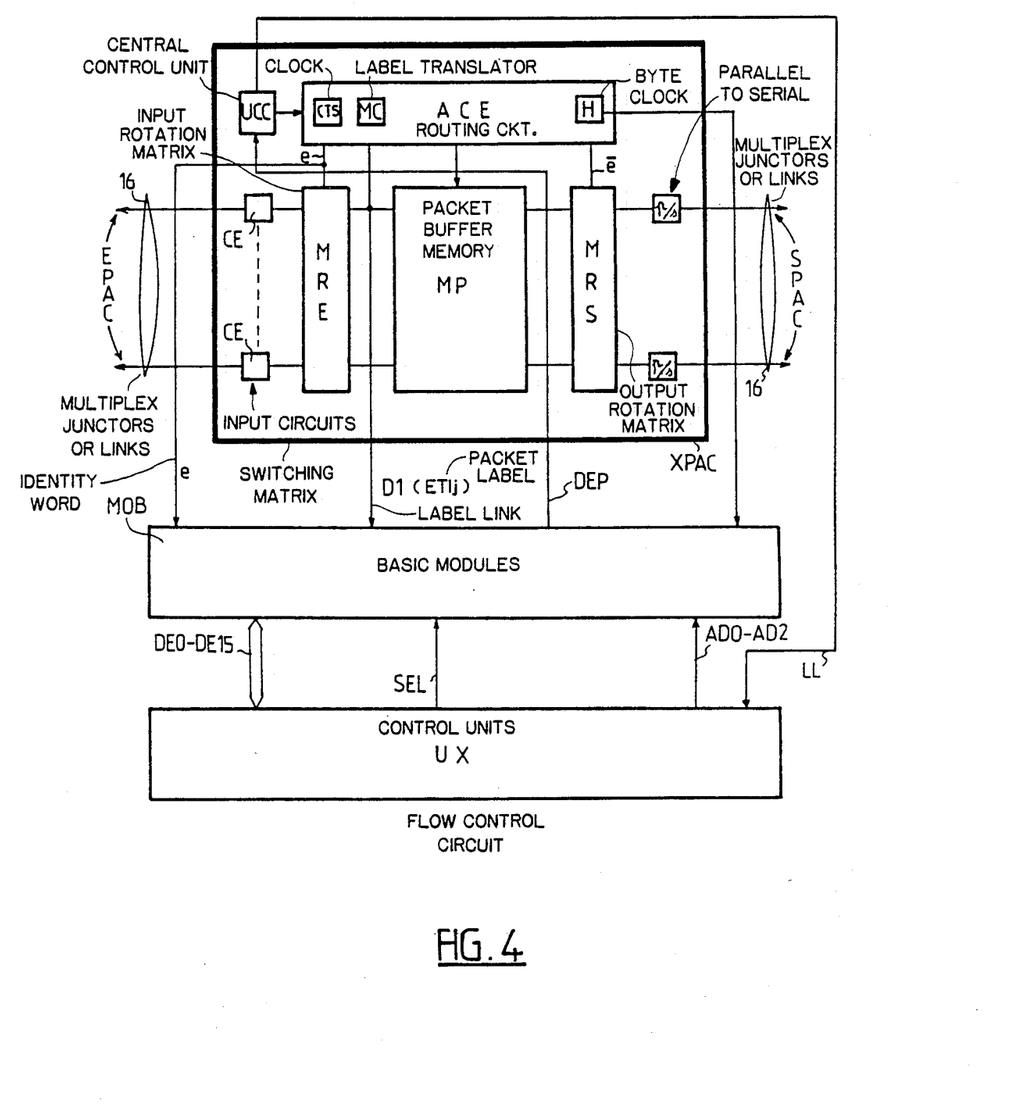
FIG. 4 shows a block diagram of a second embodiment of the flow control circuit; more complete than that of FIG. 1.

FIG. 4 illustrates a basic module MOB associated with a switching matrix XPAC with 16 entering multiplex channels EPAC and 16 exiting multiplex channels SPAC, such as mentioned above, the basic module MOB being controlled by the control unit with processor UX. In the matrix XPAC, we have shown the input circuits CE of the entering multiplex channels EPAC, the input rotation matrix MRE, the packet buffer memory MP, the output rotation matrix MRS, the output circuits p/s, the central control unit UCC, the routing circuit ACE including the label translation memory MC, the time base CTS and the local byte clock H.

Between the matrix XPAC and the module MOB, we have shown the links D1, e, H and DEP. The outgoing link D1 from XPAC successively generates the different packet labels ETIj which enter into the matrix XPAC. We recall that, according to the document EP-A-0 113 638, the link D1 is connected to the first output of the rotation matrix MRE which generates the labels ETIj to the memory MC. The link e coming from the time base CTS, is used to identify the number of the entering multiplex channel which carries the packet with label ETIj, the information e carried by this link having the same role in the matrix XPAC. The link H transmits the internal byte clock H used in the matrix XPAC. The link DEP goes from the basic module MOB to the unit UCC which deducts the command to transmit to the memory MC to no longer process a particular label ETIj coming from a particular entering multiplex channels.

Between the basic module MOB and the control unit UX, a bidirectional data bus DE0-DE15 and a write request wire SEL are provided. The bus DE0-DE15 allows the control unit UX to transmit to the basic module MOB at the same time addresses and data. When a packet switch has a number of input matrices, such as XPAC, we provide as many modules MOB as matrices, such that wires AD0-AD2 are necessary, at the output of unit UX, to select, for example, one module from eight.

Finally, between the control units UX and UCC, is provided a data exchange link 1L through which the control unit UCC transmits to the unit UX data concerning the peak rate of a newly established link which is identified by its label ETIj and the entering multiplex e which carries it. These data will be described below.

Figure 5:
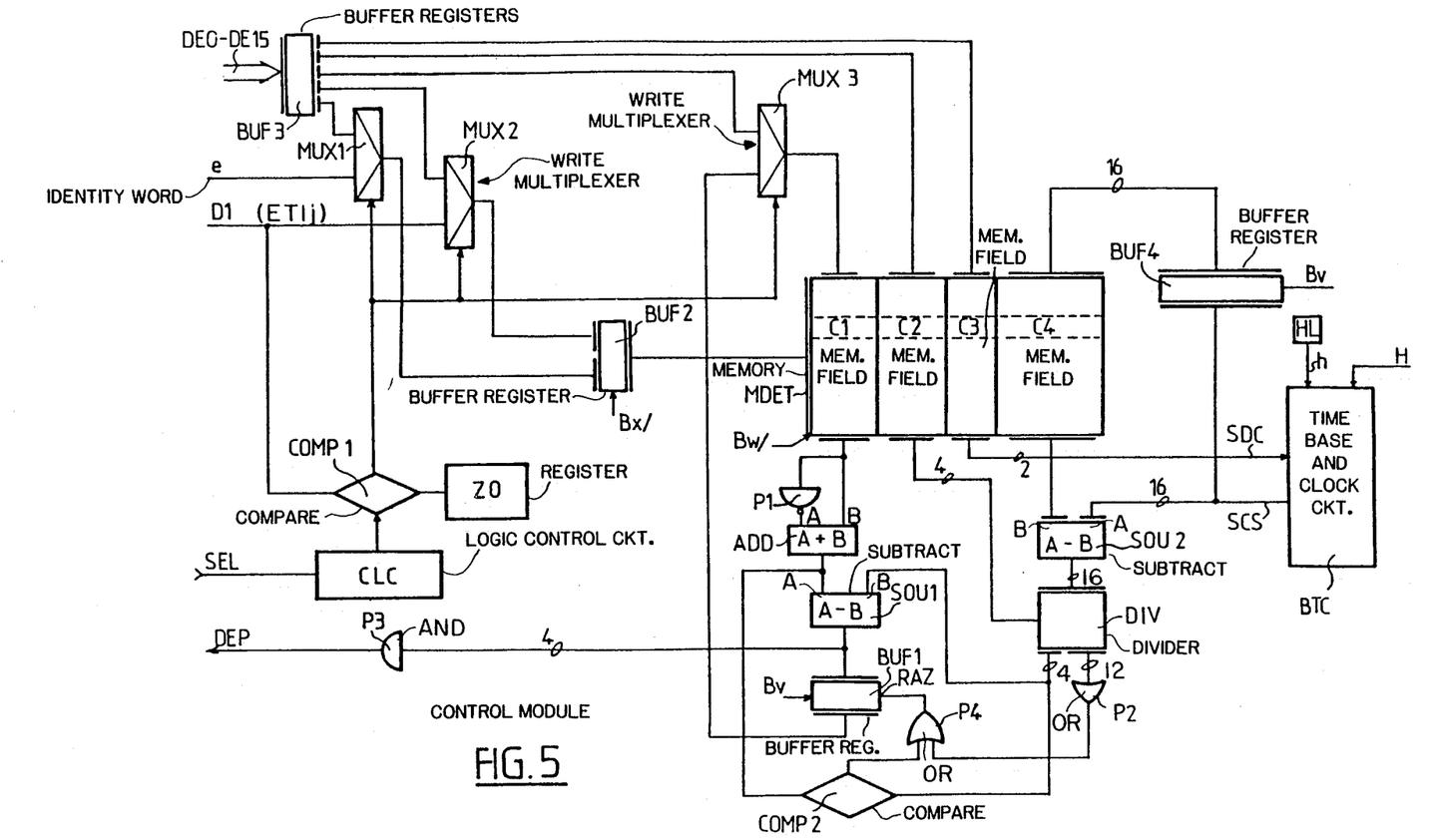
FIG. 5 is a schematic block diagram of the control module used in the circuit of FIG. 4.

The basic module shown in FIG. 5, comprises a memory MDET, a time base BTC, write multiplexers MUX1 to MUX3, buffer registers BUF1 to BUF4, an adder ADD, two subtractors SOU1 and SOU2, a divider P1V, two comparators COMP1 and COMP2, a logic control circuit CLC and basic logic circuits such as gates P1 to P4.

As we shall see below, the adder ADD and the subtracter COU make up, with the buffer BUF1, an up-down counter DETD fulfilling the same role as that of FIG. 1.

The memory MDT is organized into K words. There are as many words as possible connections through the switching matrix XPAC, here this is 4096 ($16 \times 2^8$) words since this matrix has 16 entering multiplex EPAC and processes packets whose label occupies one byte (eight bits). Thus, the word ETIj from one label and the identity word e of the entering multiplex EPAC together define the complete address of one word in the memory MDET.

Figure 6:
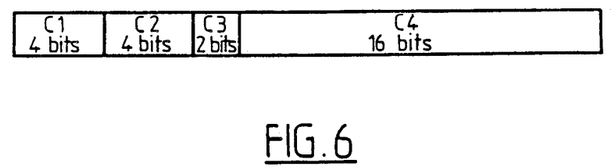
FIG. 6 illustrates the structure of a message from the memory used in the module of FIG. 6.

Each word of memory MDET, FIG. 6, is broken down into a number of fields C1, C2, C3 and C4.

The field C1 is a four bit memory being used to store the contents mC1 of up-down counter DETD between two readings of the word in question.

The field C2 is a four bit memory containing the division ratio mC2 r of the peak reference flow chosen for the connection in question, this division ratio being used in the divider D1V.

The field C3 is a 2 bit memory containing the selection address mC3 of an associated counter among the four counters Cc0 to Cc3 of the time base BTC which generates the peak flow reference.

The field C4 is a sixteen bit memory being used to store the current state mC4 of the associated counter Cc0 to Cc3 selected in the time base BTC.

The addressing input of memory MDET is connected to the output of buffer BUF2 of which one input is connected to the output of the multiplexer MUX1 and the other input to the output of multiplexer MUX2. The first inputs of multiplexers MUX1 and MUX2 are connected to links e and D1, respectively, while their second inputs are connected to corresponding outputs of buffer BUF3, respectively.

The first input of multiplexer MUX3 is connected to the output of buffer BUF1 and its second input to a corresponding output of buffer BUF3.

The control inputs of multiplexers MUX1, MUX2 and MUX3 are connected to the output of comparator COMP1 whose first input is connected to link D1 and second to the output of a register Z0 containing the byte of an empty packet label, also called the null label. The comparator COMP1 also has an enable input connected to the output of the write control logic circuit CLC. This enable input is enabled when the control unit with microprocessor UX has loaded the buffer BUF with addressing data and data to be written in the memory DETD, then enabled the circuit CLC. Note that upon establishing a link communication, the control unit UCC transmits through link LL, to the control unit UX the contents of fields C2 and C3 of the word in memory MDET which is at address ETIJ.e identifying the said communication link.

The corresponding write input to fields C1 of memory MDET is connected to the output of multiplexer MUX3. The write inputs of fields C2 and C3 are connected to corresponding outputs of buffer BUF3 respectively. The write input of fields C4 is connected to the output of buffer BUF4.

The four read wires of field C1 are connected, on one hand, to the B operand input of an adder ADD and, on the other hand, to the inputs of a NAND gate P1 whose inverted input is connected to the A operand input of adder ADD. Thus, upon each reading of a word from the memory MDET, the adder ADD adds one unit to the contents mC1 of the corresponding field C1, except if the content mC1 is already equal to 15 (in binary 1111). The four read wires of fields C2 are connected to the control input of divider DIV. The two read wires of fields C3 are connected to a selection input SDC of the time base BTC in order to do the selection of one counter from four, as we shall show in the sequel. Finally, the sixteen read wires of fields C4 are connected to the B operand input of subtractor SOU2 whose A operand input is connected to the selected output SCS of time base BTC. The sixteen wires of output SCS supply the signal Vc, FIG. 11 and are also connected to the input of buffer BUF4.

The subtractor SOU2 calculates the difference between the sixteen bit words Vc and mC4 applied to its A and B inputs respectively and generates to the divider D1V a sixteen bit difference word Ve. It carries out a division of the difference word by $2^{mC2}$, which corresponds to a left shift of mC2 steps. From the sixteen output wires of divider D1V, the first four, which carry the least significant bits making the word x, are connected, on one hand, to the B operand of subtractor SOU1 and, on the other hand, to the second input of comparator COMP2. The twelve other output wires of divider DIV are connected to the twelve inputs of an OR gate P2.

Figure 11:
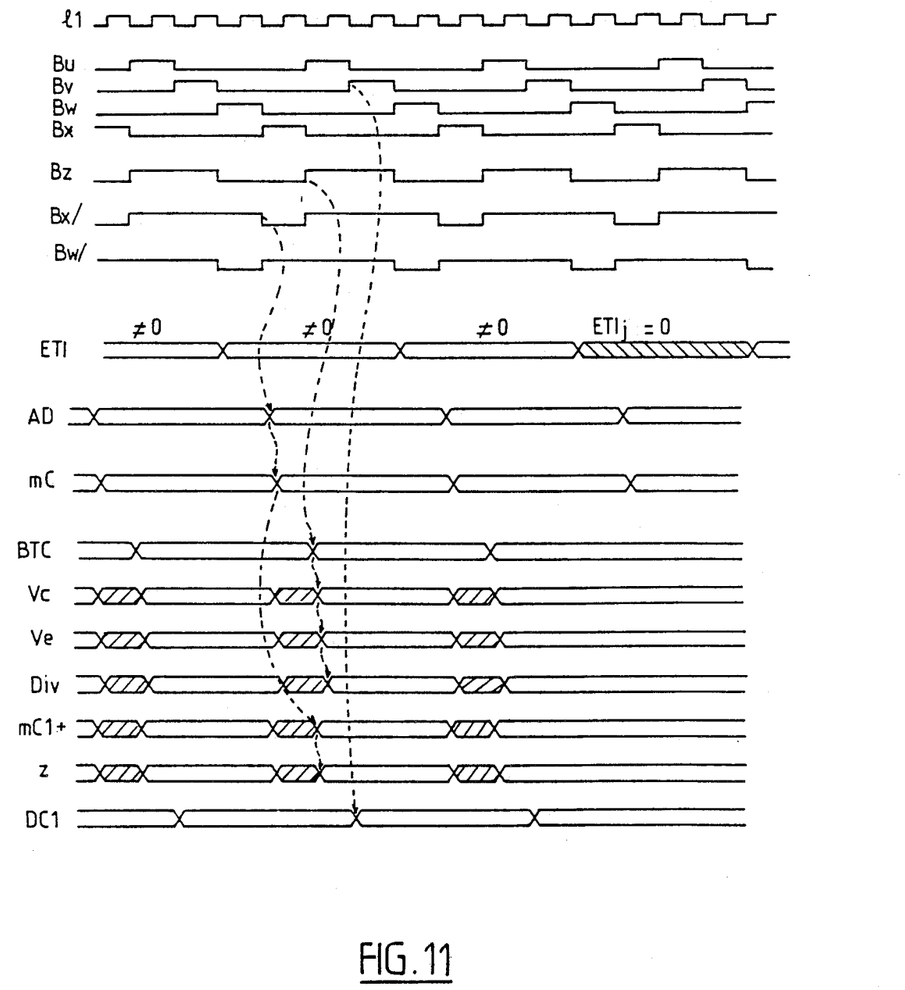
FIG. 11 shows the timing diagrams illustrating the operating cycles of the module of FIG. 5.
Figure 91:
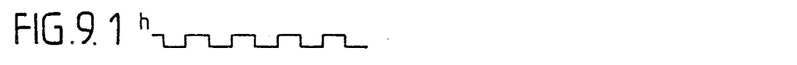
Figure 92:
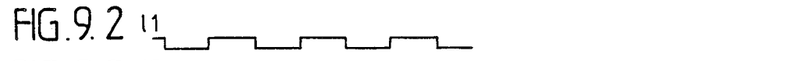
Figure 93:
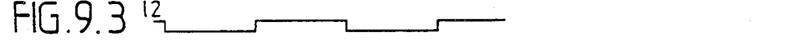
Figure 94:
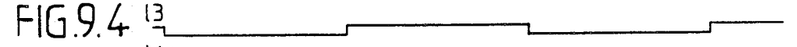
Figure 95:
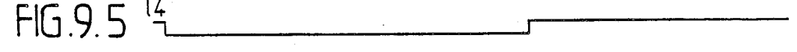
Figure 96:
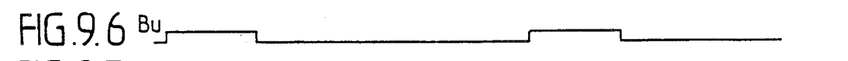
Figures 97, 98:
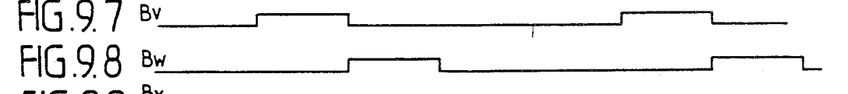
Figure 99:
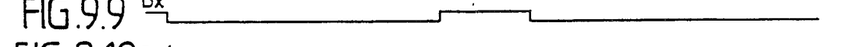

The four wire output of adder ADD is connected, on one hand, to the A operand of subtractor SOU1 and, on the other hand, to the first input of comparator COMP2. The four output wires of subtractor SOU1, supplying the word z, FIG. 11, are connected, on one hand, to the inputs of buffer BUF1 and, on the other hand, to the inputs of an AND gate P3 whose output generates the signal DEP.

The output of OP gate P2 is connected to one input of an OR gate P4 whose second input is connected to the output of comparator COMP2 and whose output is connected to the CLR input of buffer BUF1.

Figure 7:
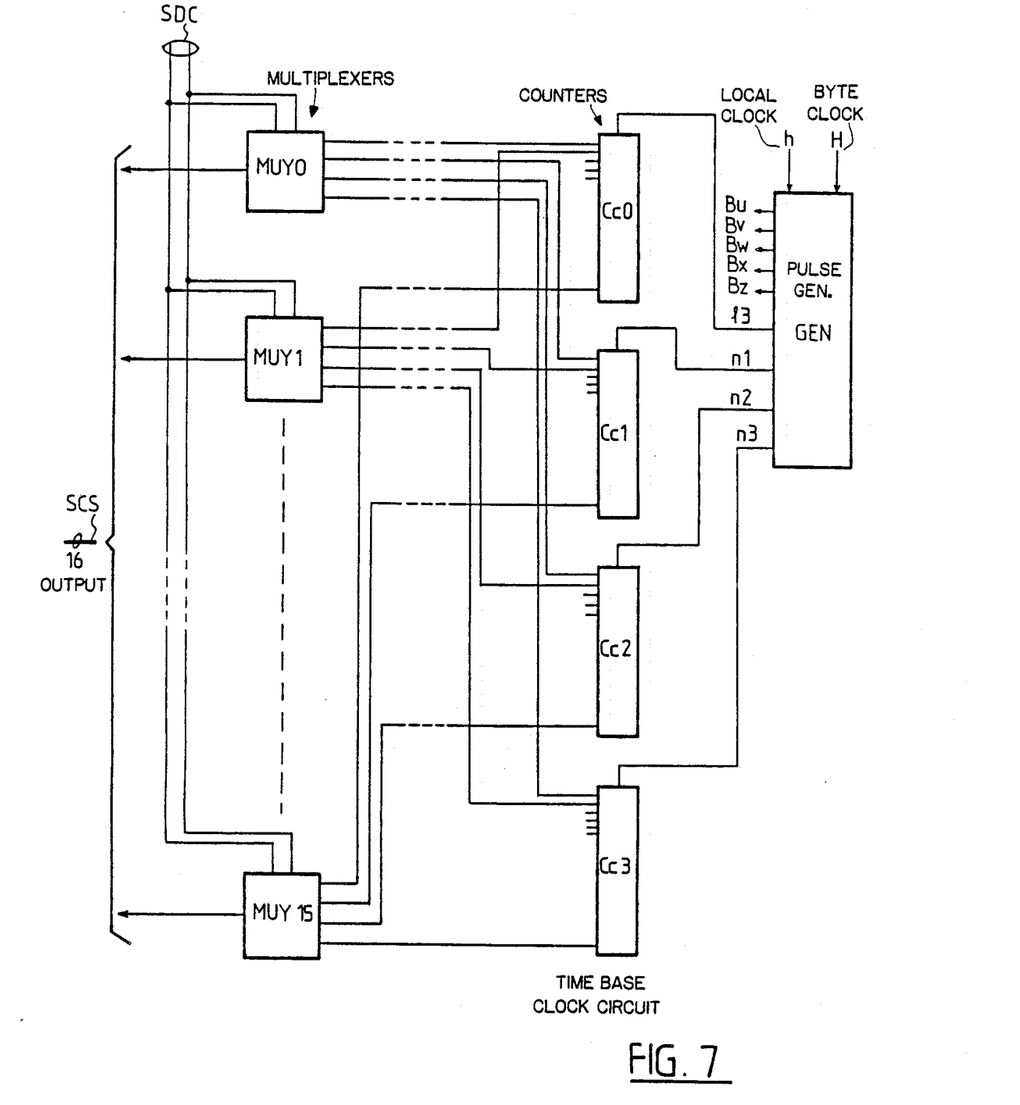
FIG. 7 is a schematic block diagram of the time base circuit of FIG. 4.

Before describing the operation of the module MOB of FIG. 5, we will describe in detail the time base BTC whose block diagram is shown in FIG. 7. The line base BTC comprises a pulse generator SEN, four counters Cc0 to Cc3 and sixteen multiplexers MUY0 to MUY15.

The pulse generator GEN, FIG. 7, comprises a four stage binary counter whose signal input receives from a source HL a local clock signal h at the rate of 280 Mbit/s and whose zero reset CLR input receives the signal H or byte clock from the matrix XPAX. The four outputs 11 to 14 of counter CPT1 generates the signals designated by the same references, the frequencies of which are 140, 70, 35 and 17.5 Mbit/s respectively. These signals h and 11 to 14 are shown in FIGS. 9.1 to 9.5. We note that the period of the signal 11 is 7 ns.

The outputs 12 to 14 are connected to the inputs of a decoder DEC1 which generates the signals Bu, Vv, Bw and Tx whose waveforms are shown in FIGS. 9.6 to 9.9. In practice, the decoder DEC1 is a logic circuit which resolves the following logic equations:

Bu=12/.13/.14/
    Bv=12.13/.13/
    Bw=12/.13.14/
    Bx=12.13.14/

We observe that each of these signals is at the high level for one period of 11, then at the low level for the next three periods. The high level times are phase shifted from one signal to the next.

Figure 910:
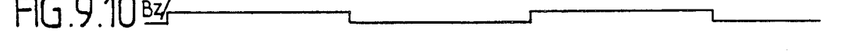

The signal 13 is also applied to an inverter INV which generates a signal Bz/ shown in FIG. 9.10.

Figure 101:
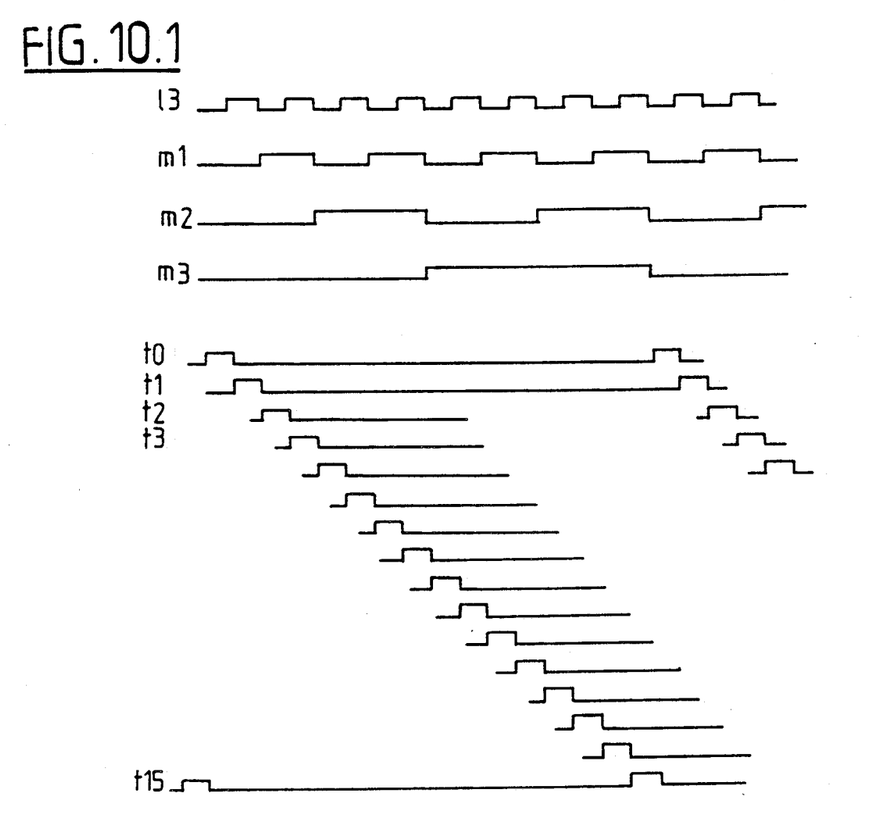

Finally, the signal 13 is applied to the input of a second binary counter CPT2 with three stages and three outputs m1 and m3 generating signals which are applied, with the signal 13, to a decoder DEC2 which generates 16 signals t0 to t15 which are shown in FIG. 10.1. The decoder DEC2 resolves logic equations similar to those mentioned above, but with four terms on the right instead of three. We note that each of the signals t0 to t15 is at the high level during one half period of signal 13, then stays 15 half periods at the low level. The high level times are shifted from one signal to the next. Note that the signal 13, which is periodic, corresponds to a rate of 35 Mbit/s.

Figure 102:
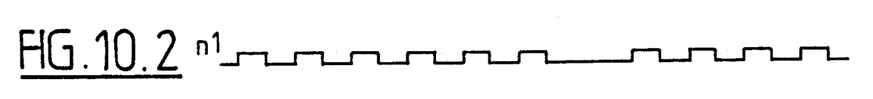

The generator GEN comprises also three OR gates P4 to P6. The OR gate P4 has seven inputs which are connected to the outputs t1, t3, t5, t7, t9, t11 and t13 of decoder DEC2 respectively. Its output generates the signal n1 which is shown in FIG. 10.2. We note that this signal, which is not periodic, corresponds to an average rate of 30.6 Mbit/s with an average period of 32.7 ns.

Figure 103:
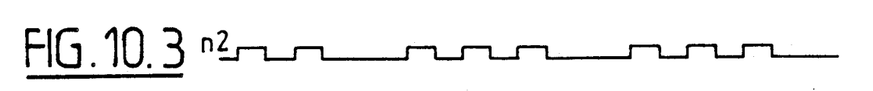

The OR gate P5 has six inputs which are connected to the outputs t1, t3, t7, t9, t11 and t15 of decoder DEC2 respectively. Its output generates the signal n2 shown in FIG. 10.3. This signal, which is not periodic, corresponds to an average rate of 26.2 Mbit/s with an average period of 38 ns.

Figure 104:
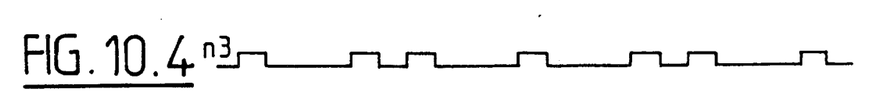

The OR gate P6 has five inputs which are connected to the outputs t1, t5, t7, t11 and t15 of decoder DEC2 respectively. Its output generates the signal n3 shown in FIG. 10.4. This signal, which is not periodic, corresponds to an average rate of 21.87 Mbit/s with an average period of 45.7 ns.

The signals 13 and n1 to n3 are applied to the signal inputs of sixteen stage binary counters Cc0a to Cc3 respectively.

Each multiplexer MUYi has four signal inputs which are connected to the ith order outputs of counters Cc0 to Cc3 respectively. Each multiplexer MUYi has two control wires connected to the two input wires of selection control SDC respectively. Thus, upon receiving a two-bit selection word, the setup consisting of the multiplexers MUY0 to MUY15 retransmits the state of one of the counters Cc0 to Cc3. The outputs of multiplexers MUY0 to MUY15 are connected to the sixteen wire output SCS.

With reference again to FIG. 5, it appears that upon reading a word in the memory MDET, the wires SDC are enabled, such that the sixteen bit word Vc is generated to the A operand of subtractor SOU2. Simultaneously, the reading of field C4 produces the sixteen bit word mC4 applied to the B operand of subtractor SOU2, which generates the difference (A−B) in the form of a sixteen bit word Ve to the divider D1V. In the divider, the reading of field C2 will control the number of shifts mC2 to the left in order that the four least significant bits, making the word x, be used in the subtractor SOU1. Finally, at the time of writing in the memory MDET, the contents of buffer BUF4 will refresh the contents mC4 of field C4 by writing into it the word supplied by the outputs SCS of the time base BTC. It is understood that at each reading of a word from the memory MDET, the subtractor SOU2 supplies the number of the counter Cc0 to Cc3 selected by SDC to increment since the previous reading. The use of the four counters Cc0 to Cc3, with the divider D1V, allows a considerable economy of means. In fact, we could have multiplied the number of counters of the time base BTC up to sixteen and remove the divider. But this solution requires multiplexers with more inputs. On the other hand, it may be seen that the signals n1 to n7, even if they are not strictly periodic, do not have any large gaps between two adjacent pulses. However, the multiplication of these signals would lead to the introduction of very large gaps.

It follows from the above that the four least significant bits of the output word of divider D1V represent the number x of pulses IC, by taking again the notations of FIG. 2a which were given since the previous reading of the word in question. Thus this word is read when its address is transmitted by the buffer BUF2 to the addressing inputs of memory MDET, that is when D1 transmits the label of the word and that e identifies the entering multiplex channels in question. The reading of the words brings about the transfer of the contents mC1 of four bit field C1 to the B operand of adder ADD. If this content mC1 is less than 15, the gate P1 transmits to the A operand a 1 which represents a pulse IP of FIG. 2a. The adder DD thus generates the value (mC1+1). If the contents mC1 of field C1 is already equal to 15, the gate P1 generates a 0 and the adder ADD generates the value mC1, equal to 15.

The subtractor SOU1 subtracts from mC1 or (mC1+1) the value x and generates either (mC1−2) or (mC1+1−x). This value z is transmitted to the buffer BUF1 for writing at the same address in the memory MDET where it becomes the new content mC1 of field C1. Furthermore, if this value is equal to 15, the AND gate P3 transmits through its output the signal DEP which causes the deletion of the packets in question in the matrix XPAC, as mentioned earlier.

In other respects, if the time interval between the arrivals of two packets regarding a particular communication, that is the time interval between two readings of the same word, is very large, it is possible that the value of the output word of divider DIV be greater than 15. In this case, the value x is without meaning, but since at least one of the most significant bits is at 1, the OR gate P2 transmits, through OR gate P4, a CLR signal to buffer BUF1. The new value mC1 written in field C1 of memory MDET will thus be 0.

In the case where the value applied to the B operand of subtractors SOU1 is greater than that applied to its A operand, the subtractor SOU1 transmits a zero value to buffer BUF1. If the applied values are equal, the comparator COMP2 also transmits by OR gate P4, a CLR signal to buffer BUF1.

It is apparent that the set consisting of the adder ADD, the subtractor SOU1 and the buffer BUF fulfills the same purpose as the up-down counter DEDT of FIG. 1.

Figure 8:
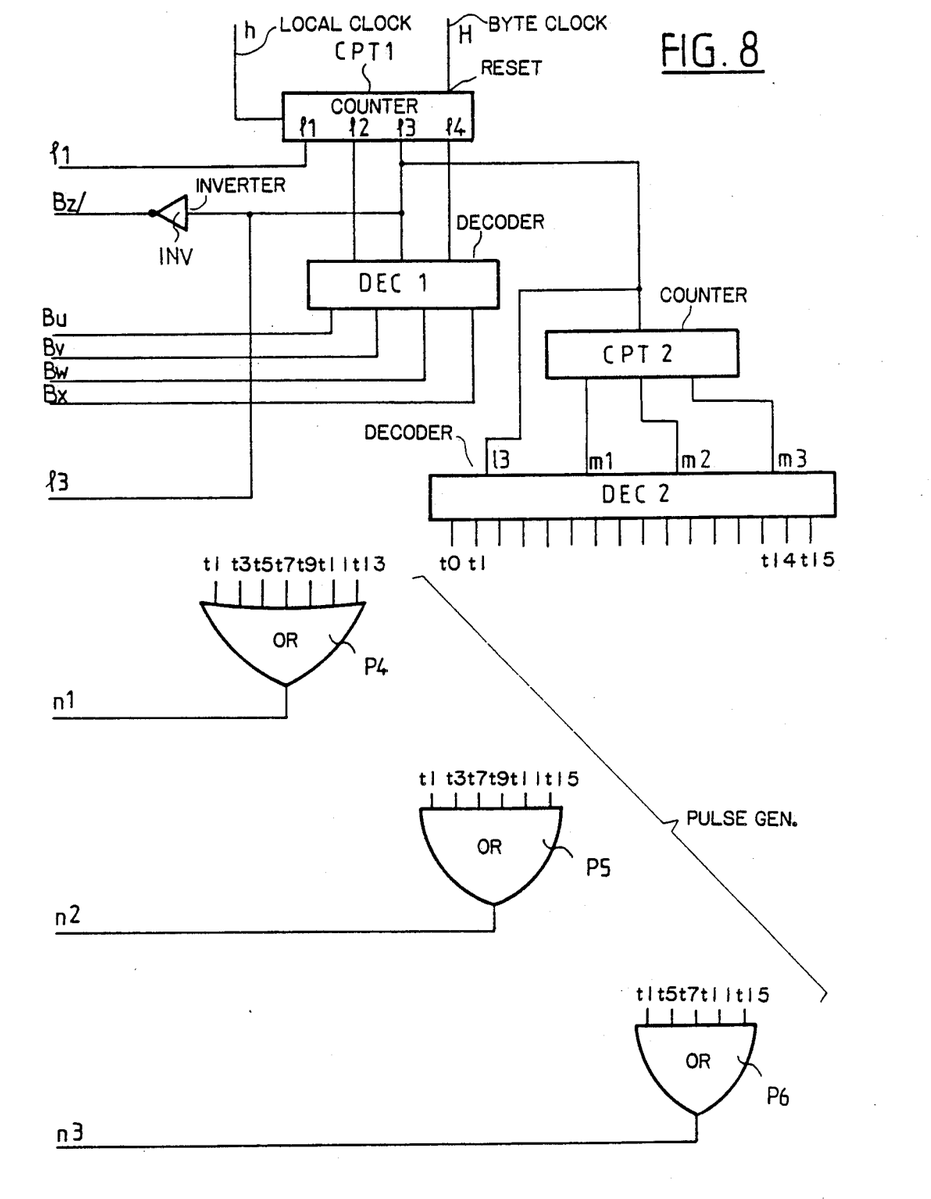
FIG. 8 is the schematic of the pulse generator in the time base of FIG. 7, FIGS. 9.1 to 9.10 are timing diagrams illustrating the signals generated in the time base of FIG. 7, FIGS. 10.1 to 10.4 are the timing diagrams of other signals generated in the circuits of FIG. 7 and 8.

The timing diagrams of FIG. 11 illustrate the unfolding of the read-write cycle of memory MDET allowing the execution of the operations which have just been described. We find diagrams of the signals 11, Bu, Bv, Bw, Bx and Bz whose generation was described in relation with the FIGS. 8, 9.2 and 9.6 to 9.10. The diagrams of the signals Bx/ and Bw/ are also shown. The signal Bx/ is applied to buffer BUF2. The signal Bw/ is applied to the read-write control of memory MDET. The signal Bv is applied to buffers BUF1 and BUF4.

The timing diagram ETI represents the succession of words e applied to multiplexers MUX1 and MUX2 respectively, coming from the matrix XPAC. When this word is different from a null label, which is 0 in FIG. 11, it triggers a flow control cycle and, when it is equal to that of a null, which is 0 in FIG. 11, it gives to the control unit UX the possibility to write in the memory MDET.

The timing diagram AD shows the instance at which a new read address, deducted either from the word D1,e, or from data provided by the unit UX, is validated, by Bx/, in buffer BUF2. The timing diagram mC to mC4 of fields C1 to C4 respectively are available for reading to the adder ADD, the control input of the divider DIV, the input SDC and the B operand of subtractor SOU2 respectively.

The timing diagram BTC shows the instance where the counters Cc0 to Cc3 change state in the time base BTC, this instance being defined by the signal Bz.

The timing diagram Vc shows the instance where the multiplexers MUY0 to MUY15 are controlled to give the value Ve of the A operand to subtractor SOU2. The timing diagram Ve shows the times when the calculation of (A−B) is finished in the subtractor and the timing diagram Div the moment when the division in divider DIV is complete to give the B operand to subtractor SOU1.

The timing diagrams Mc1+ and z show the times when the addition operation is complete in adder ADD and when the subtraction operation is complete in subtractor SOU1 respectively. The timing diagram DC1 shows the times at which the output values of buffers BUF1 and BUF4 are given, controlled by Bv.

We must note that the leading edge of signal Bw/ triggers the writing of the values present in BUF1 and BUF4 to the fields C1 and C4.

It is apparent that a cycle is described starting with the following addressing ETIj and e, which allows the reading of the fields C1 to C4, then the carrying out of the operations on the contents mC1, mC4 and the selections by the contents mC2 and mC3, and, finally, the writing of the new values of mC1 and mC4, before the new addressing which retriggers a cycle.

When an empty packet appears on an entering junction EPAC, its label is recognized in the comparator COMP1 which switches the multiplexers MUX1 to MUX3 and, on the other hand, inhibits the reading of the memory MDET. One write cycle is thus open in which the microprocessor of the control unit UX causes the writing at an address contained in buffer BUF3, the data which is also written in the buffer BUF3. A person knowledgeable in the field would easily determine that it has the same duration as the cycle previously described, which is why it appeared pointless to describe it in detail. As soon as such an update has taken place, the control unit prepares a new writing through buffer BUF3 and the circuit CLC re-enabled by the link SEL.

We claim:

1. A process for controlling the flow of data packets carried by asynchronous time multiplex channels of a system comprising an up-down counter means having a down counting input which receives pulses of the communication at a maximum peak rate that is allocated to the pertinent communication and having another counting input which receives a pulse upon the transmission of each data packet belonging to the pertinent communication, each of the data packets from any one communication carried by said channel being identified by its label and by an identity of the multiplex channel which carries it, said process comprising the steps of:

A. allocating to each communication a predetermined clock frequency and a predetermined threshold value representing a particular difference between a number of entering data packets and a number of clock pulses generated at said predetermined clock frequency, and operating said up-down counter means in response to said received data packets;

B. determining an actual difference between a number of entering data packets belonging to the communication and a number of pulses generated at said predetermined clock frequency;

C. setting a boundary for this difference determined in step B; and

D. if said difference reaches the said predetermined threshold, triggering a signalling process which starts a deletion of data packets belonging to the pertinent communication until said difference returns to a value which does not reach said predetermined threshold, a maximum count output of the up-down counter means generating a signalling requesting a reduction in rate of said received pulses of said communication.

2. The process in accordance with claim 1, and the further steps of: sending a signal to a source transmitting the pertinent communication in order to request it to reduce its rate of transmission, and for transmitting a message warning said source that there may be a loss of data packets during transmission.

3. The process in accordance with claim 1, and the further steps of: sending a signal to a source transmitting the pertinent communication in order to request it to reduce the clock frequency rate of transmission, and for transmitting a message warning said source that there may be a loss of data packets during transmission at said reduced rate.

4. The process in accordance with claim 1 and the added step of occasionally receiving empty packets, identifying empty packets upon the arrival thereof responsive to an empty packet label carried by said packets in order to inhibit an addressing of the memory during reading.

5. The process in accordance with claim 4, and the added step of triggering an access authorization to the memory during a writing period for the control unit in response to said identifying an empty packet.

* * * * *